United States Patent [19]
Gandy et al.

[11] Patent Number: 5,617,688
[45] Date of Patent: Apr. 8, 1997

[54] ADJUSTABLE SHUTTER WITH REVERSIBLE END CAP

[75] Inventors: Ginger Gandy, Cincinnati, Ohio; Doug Vagedes, Union; Michael Vagedes, Florence, both of Ky.

[73] Assignee: Richwood Building Products, Inc., Richwood, Ky.

[21] Appl. No.: 633,062

[22] Filed: Apr. 16, 1996

[51] Int. Cl.$^6$ .................................................. E06B 7/08
[52] U.S. Cl. ................. 52/473; 52/586.2; 52/800.12; 403/363; 403/331; 403/381
[58] Field of Search ........................ 52/473, 314, 474, 52/823, 586.2; 403/363, 375

[56] References Cited

U.S. PATENT DOCUMENTS

| | | | |
|---|---|---|---|
| 3,455,079 | 7/1969 | Frederick | 52/473 |
| 3,797,186 | 3/1974 | Smith | 52/473 X |
| 4,251,966 | 2/1981 | Foltman | 52/473 X |
| 4,765,110 | 8/1988 | MacLeod | 52/473 |
| 5,060,442 | 10/1991 | Chubb | 52/473 |
| 5,152,116 | 10/1992 | MacGowan | 52/473 |
| 5,347,782 | 9/1994 | Vagedes | 52/473 |
| 5,373,677 | 12/1994 | Vagedes | 52/473 |
| 5,430,986 | 7/1995 | Vagedes | 52/473 |
| 5,524,407 | 6/1996 | Ricard et al. | 52/473 |

*Primary Examiner*—Carl D. Friedman
*Assistant Examiner*—Beth Aubrey
*Attorney, Agent, or Firm*—Wood, Herron & Evans, L.L.P.

[57] ABSTRACT

A shutter assembly having a main body with slats, vertical stiles and end caps that allow the length of the shutter assembly to be varied. The end caps are attached to the upper and lower ends of the main body by aligning apertures in the end caps with one of a plurality of apertures spaced vertically on the ends of the stiles. The end caps each have a first and a second panel that can be reversibly displayed as an outer surface of the shutter. An inner surface of the stiles has fastener pins protruding therefrom, allowing the shutter assembly to be mounted to a building structure.

11 Claims, 2 Drawing Sheets

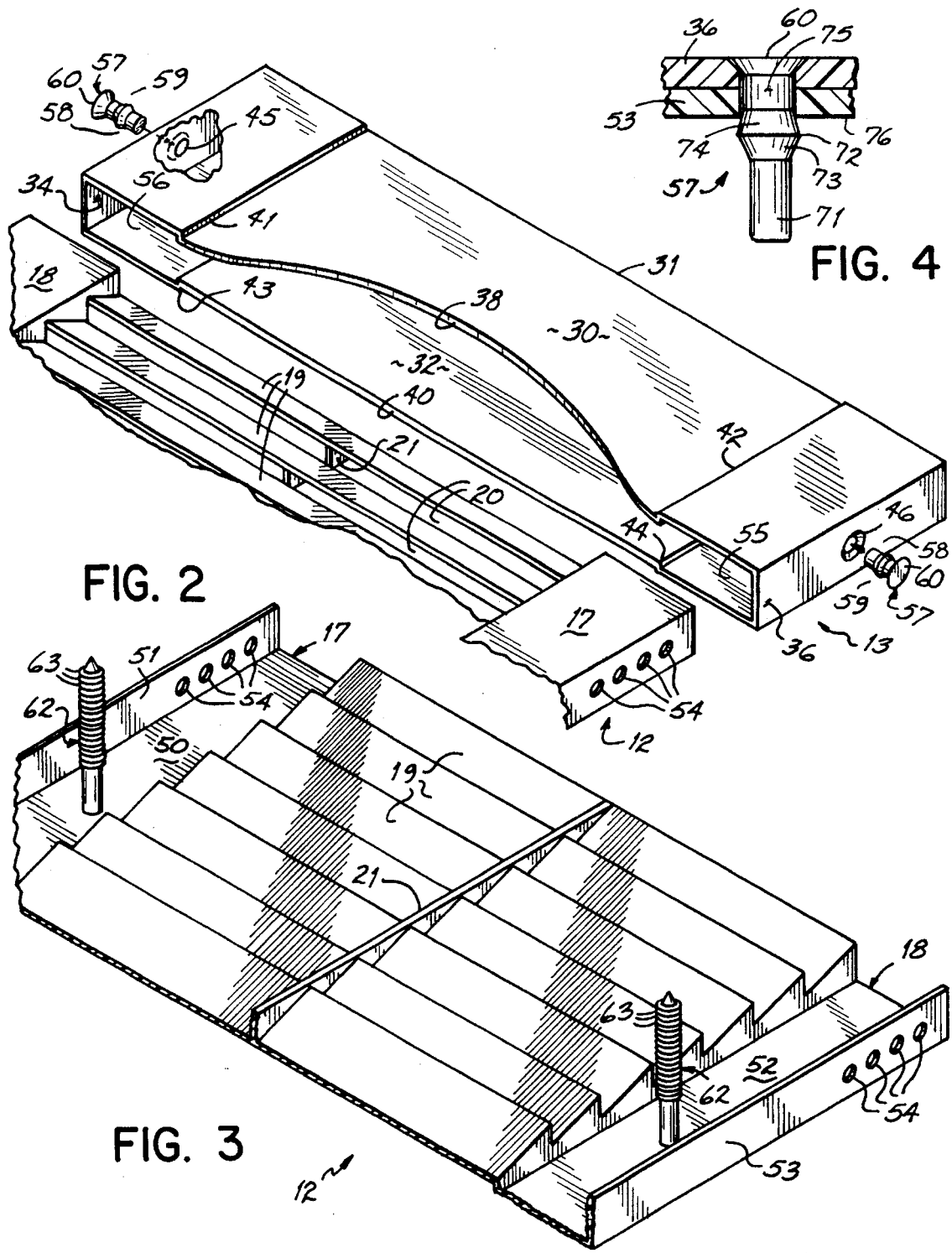

ADJUSTABLE SHUTTER WITH REVERSIBLE END CAP

BACKGROUND OF THE INVENTION

Most home window shutters serve only an ornamental function. As such, most of these are formed, for example, by injection molding using colored plastic to provide a plastic shutter that does not rot and generally does not require painting. Building material distributors and retailers stock various colored shutters.

Windows come in many different lengths, and as such, the shutter must correspond in size to the length of the window. Therefore, in addition to a variety colors, shutters are manufactured in a number of different sizes. Thus, the distributor must not only stock different colors, but also must stock different sizes, frequently ten to fifteen different sizes. The problem created by this is quite obvious. The volume of shutters that must be stocked is prohibitive for many distributors.

To overcome this problem, plastic shutters have been formed which can be adjusted in size. Several of these are disclosed in U.S. Pat. Nos. 5,152,116, 4,765,110, 3,455,079, and 4,251,966.

The problem with each of these designs is that adjustment of the shutter is too complex. Generally, the complexity of the adjustment requires the distributor instead of the end user to make the adjustment. Precise cuts are required plus assembly using various fasteners, plastic rivets and the like. This is totally unacceptable if one wishes to adjust the size of the shutter at the job site. The large number of separate components causes these shutters to rattle and can easily fall apart.

Improved shutters are described in U.S. Pat. Nos. 5,347,782, 5,373,677, and 5,430,986. The shutters disclosed in these patents overcome many of the problems associated with earlier adjustable shutters. Unfortunately, these shutters require different end pieces for the top and bottom. Further, a shutter with a distinctively designed end caps is desired, as opposed to a shutter with end caps having merely straight edges, separate end caps are needed.

There is a distinct need for a shutter that can be easily mounted to a home or building structure without the need for screws, bolts or the like. Further, there is a need to simplify adjustment and installation of these shutters. Also, there is a need for a shutter having end caps with a different design on the opposite faces of the end caps, the end caps being reversible so that the appearance of the shutter can be changed.

SUMMARY OF THE INVENTION

Accordingly, it is an object of the present invention to provide a shutter which can be shortened easily and simply, permitting adjustment at the job site.

It is also an object of the present invention to provide a shutter which can be lengthened or shortened easily, quickly assembled, and installed without bolts, screws, or the like.

It is a further object of the present invention to provide a shutter that has end caps having different designs on opposite faces that can be reversed at the job site to change the aesthetic appearance of the shutter and thus reduce the number of molds required to make the parts and the number of parts which must be stocked.

The objects and advantages of the present invention are obtained by providing a shutter which has a body portion without fixed end caps. In its broadest aspects, the shutter assembly comprises a body portion having upper and lower unfinished ends. The body portion comprises one molded piece including the stiles and slats. The ends of the shutter are then covered with preformed end caps.

The end caps can slidably engage with the upper and lower ends of the body portion providing up to about four inches of adjustment without cutting the body portion.

Each end cap includes a first panel and a second panel that can be reversed so that either the first or the second panel can be displayed as an outer surface of the shutter. These end caps are provided with different designs on the first and second panels, such as scalloped on the first panel and a straight edge or plain appearance on the second panel. This permits one end cap to provide a shutter having an ornamental shutter or a plain shutter. Further the end caps can be mounted so that the first panel having the design can be displayed on one end of the shutter, and the second panel having the plain appearance can be displayed on the opposing end of the shutter.

Each end cap has at least one aperture which aligns with apertures spaced along the ends of the stiles. A fastener sized to snugly fit in the apertures holds the end cap to the shutter body portion with both sides properly aligned.

In a preferred embodiment, the stiles each have an inner surface with at least four fastening pins molded therein. The shutter assembly can be attached to a building by inserting the pins into holes drilled into the building siding.

The shutter is assembled by sliding end caps over the upper and lower ends of the body portion and positioning the cap to provide an appropriate length for the shutter. The aperture in each of the sidewalls of the caps is aligned with one of the plurality of apertures in the sidewalls of each of the stiles. A fastener sized to snugly fit through the apertures is pressed through the aligned apertures on each side of the shutter. The shutter is then fixed to a building or house by pressing the fasteners protruding from the inner surfaces of the stiles into apertures drilled in the siding of the building. This holds the shutter to the side of the building or house.

The objects and advantages of the present invention will be further appreciated in light of the following detailed description of the preferred embodiment taken in conjunction with the accompanying drawings.

BRIEF DESCRIPTION OF THE DRAWINGS

FIG. 2 is perspective view of a portion of the shutter assembly showing the assembly of the cap onto the shutter body.

FIG. 3 is perspective view of a portion of the shutter showing the inside surface of the stiles and fastening pins protruding therefrom.

FIG. 4 is a cross-sectional view taken at lines 4—4 of FIG. 1.

DETAILED DESCRIPTION

Figure 1:
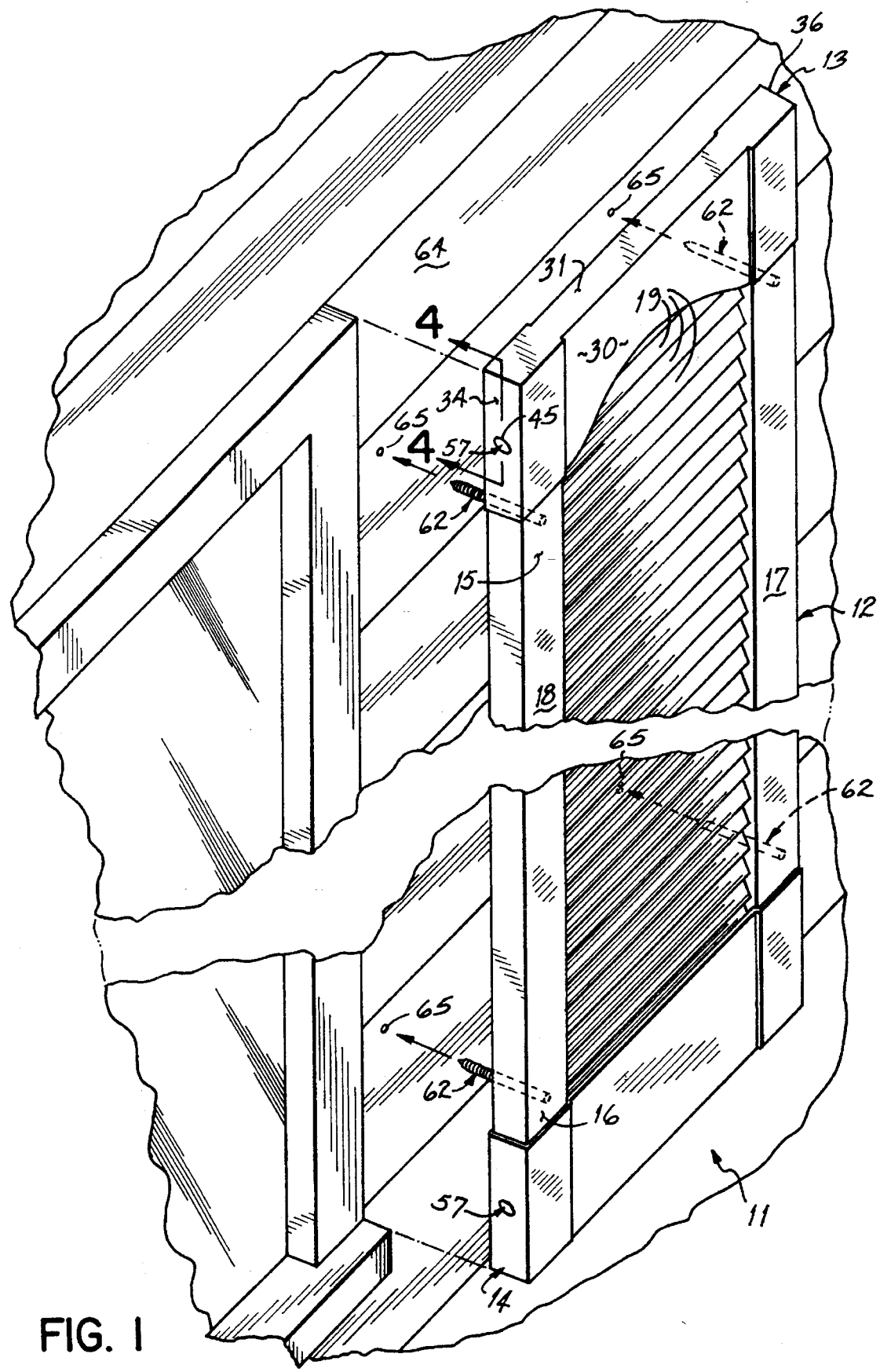
FIG. 1 is perspective view of one embodiment of the shutter assembly of the present invention as attached to a building.

The present invention is a plastic shutter assembly 11 preferably injected molded from, for example, polypropylene. Referring to FIG. 1, the shutter assembly 11 includes a body portion 12, a top cap 13, and a bottom cap 14. The body portion 12 has an upper end 15 and a lower end 16 having a right stile 17 and a left stile 18 parallel to each other. Separating the two stiles are the slats 19 which are separated by spaces 20. The brace 21, the slats 19 and the stiles 17 and 18 are generally molded as one piece. Running through a central portion of the slats 19 is a vertical brace 21. The slats 19 can also be molded as one solid piece without spaces, or other decorative designs can be used in place of the slats 19 such as molded raised panels.

Although only one cap is required, preferably, the adjustable shutter will include both the top cap 13 and the bottom cap 14. Except as noted, top cap 13 and bottom cap 14 are the same and only cap 13 is described in detail. Referring to FIG. 2, top cap 13 includes a first panel 30, a horizontal endwall 31, a second panel 32, a first lateral wall 34, and a second lateral wall 36. The first panel 30 has opposite the horizontal end wall 31 a horizontal lip or edge 38. The second panel 32 also has opposite the horizontal end wall 31 a horizontal lip or edge 40. The horizontal lip 38 of the first panel 30 may be curved or scalloped for ornamental purposes, while the horizontal lip 40 of the second panel 32 is straight. The present invention is not limited to these curved and straight designs of the horizontal lips 38 and 40, and these designs are merely presented for illustrative purposes only. However, panel 30 and panel 32 will preferably have a different appearance or design.

The horizontal lip 38 of the first panel 30 does not extend all the way to the first and second lateral walls 34 and 36, but instead stops at edges 41 and 42. The horizontal lip 40 of the second panel 32 also does not extend to the first and second lateral walls 34 and 36, but instead stops at edges 43 and 44. The distance from edges 42 and 44 to lateral wall 36 and the distance from edges 41 and 43 to lateral wall 34 corresponds to the outer widths of stiles 17 and 18 respectively. The first lateral wall 34 has an aperture 45 and the second lateral wall 36 also has an aperture 46.

Except as noted, the right stile 17 and left stile 18 are the same. Right stile 17 has an inner surface 50 and a vertical sidewall 51. Left stile 18 also has an inner surface 52 and a vertical sidewall 53. The vertical sidewalls 51 and 53 each have a plurality of apertures 54, spaced vertically along the upper and lower ends 15 and 16 of the stiles 17 and 18. The top cap 13 is assembled to the body portion 12 by sliding the top cap 13 over the upper end 15 of the body portion 12. The area 55 defined by edges 42, 44, and sidewall 36 is just wide enough so that stile 17 snugly slides between edges 42 and 44. Similarly, the area 56 defined by edges 41, 43, and vertical sidewall 34 is just wide enough to permit stile 18 to snugly slide between edges 41 and 43.

The top cap 13 is fastened to the body portion 12 by aligning the aperture 45 defined in the sidewall 34 with one of the plurality of apertures 54 defined in the stile 18. A fastener 57 having a head 60 larger in diameter than the aperture 45 is inserted through the aperture 45 and through the aligned aperture 54 of stile 18. As shown in FIG. 4, fastener 57 is a unique fastener which has several advantages. Fastener 57 includes a cylindrical leader section 71 which has a diameter smaller than apertures 45 and 54. Next to leader section 71 is an enlarged portion 72. Enlarged portion 72 includes a leading tapered section 73 and a trailing tapered section 74. Between head 60 and trailing tapered section 74 is a shaft portion 75 which has a diameter approximately equal to a slightly smaller than apertures 45 and 54.

The distance between the head 60 and trailing tapered section 74 is slightly less than the combined thickness of walls 36 and 53. Thus, the back side 76 of wall 53 engages the trailing tapered section 74, as shown in FIG. 4. This holds the assembly tightly together. Since the trailing section 74 is tapered, as opposed to stepped, the fastener can be forced back out by pushing against the end of body section 71. This permits one to correct errors in placement of the fastener. Similar to that just described for the aperture 45, the aperture 46 in the sidewall 36 is aligned with one of the apertures 54 defined in the stile 17 and the fastener 57 is pressed therethrough. Of course, other fasteners can be used in place of fastener 57 as desired.

With the shutter assembly 11 fastened as described above, the first panel 30 of the top cap 13 having the curved horizontal lip 38 faces outwardly when the shutter assembly is mounted to a home. In accordance with the present invention, the top cap 13 could have been fixed to the body portion 12 so that the second panel 32 having the straight horizontal lip 40 faces outwardly. Therefore, the present invention provides a shutter in which the design of the end caps 13 and 14 can be changed by reversing the orientation of the first and second panels 30 and 32.

The first and second panels 30 and 32 of end cap 13 are at least about 1 inch long (as measured from lip 38 and lip 40 to horizontal end wall 31) and preferably 2 to 4 inches long. This provides sufficient area to cover the upper end 15 of the shutter body portion 12.

As previously discussed, the invention provides the means to adjust the length of the shutters so that they can be used for a variety of different windows. End caps which are three inches long can cover the top and bottom three inches of the shutter or they can cover as little as one inch. Thus, by sliding the top and bottom caps, aligning the apertures in the lateral walls of the end caps with the apertures in the side walls of the stiles, and fitting a fastener through the aligned apertures, the length of the shutter can be adjusted up to four inches.

Accordingly, the apertures 45 and 46 defined in sidewalls 34 and 36 respectively and the apertures 54 defined in the sidewalls 51 and 53 of stiles 17 and 18 respectively are positioned to allow the top cap 13 to be adjusted to cover one to three inches of the body portion 12. Additionally, the apertures 45 and 46 are spaced at a distance from horizontal endwall 31 so that the apertures 54 are preferably all completely covered when the shutter is assembled to provide a pleasing aesthetic appearance.

As shown in FIG. 3, the stiles 17 and 18 each have molded therein two fastening pins 62 that protrude from the inner surfaces 50 and 52 of the stiles for fastening the shutter assembly 11 to a home or similar building structure. Preferably, a total of four of the fastening pins 62 are provided near the upper and lower ends 15 and 16 of the body portion 12. The fastening pins 62 are long enough so that they can be engaged to a depth of at least 0.5 inch into a plurality of apertures 65 in a house 64 or similar building structure to which the shutter assembly 11 is mounted, as shown in FIG. 1. The apertures 65 are spaced in a manner to receive the fastening pins 62.

The fastening pins 62 have a plurality of ribs disposed along the longitudinal axis of the pins 63 slightly larger than the diameter of the apertures 65 so that the pins 62 flex inwardly as they pass apertures 65 and then flex outwardly to hold the shutter to the house 64. If desired, an installer can snap off the pins 62 and simply install the shutter with screws.

Thus the present invention provides a shutter assembly that can be easily and quickly adjusted, assembled, and mounted to a building structure without the use of bolts, screws, and the like. The pin 62 permits the shutter to be attached to the building without any screw heads or other fastener showing. Furthermore, the present invention also provides a shutter assembly that has end caps that can be reversed so that either a first panel or second panel having ornamental designs different from each other can be displayed as the outer surface of the shutter assembly.

This permits the manufacturers to mold one end cap which can be mounted two different ways to the body portion. A number of shutter bodies can be molded to account for different sized windows. But the adjustability of the end caps reduces the number of shutter bodies which must be stocked. Further, the one style end cap can be used to provide four different shutters: plain faced on both top and bottom; decorative faced on both top and bottom; decorative faced top and plain faced bottom; and plain faced top and decorative faced bottom. This maximizes design variation and minimizes stocking requirements and reduces the number of molds needed to manufacture shutters.

This has been a description of a preferred embodiment of the present invention along with the preferred method of practicing the present invention. Those of ordinary skill in the art will readily recognize that many modifications still falling within the spirit and scope of the invention are possible. For example, the design of the lip portions of the shutter assembly is not limited to a curved or straight design. Additionally, many types of different fasteners can be used to assemble the shutters and mount the shutters to a building structure. The present invention is not to be bound by the details described herein but only to be bound by the scope of the appended claims.

I claim:

1. A shutter assembly having an outer and an inner surface comprising:

a body portion having upper and lower ends including two vertical stiles;

a cap having first and second vertical side walls and a first panel extended from said first vertical side wall to said second vertical side wall, and a second panel extended from said first vertical side wall to said second vertical side wall, said first panel and said second panel being spaced apart and reversible, and each having a different ornamental appearance so that said first panel and said second panel can be alternately displayed as the outer surface of said shutter, said cap formed to receive and surround one of said upper and lower ends of said body portion in a sliding manner, thereby allowing the length of said shutter to be adjusted by covering selected lengths of said one of the ends with said cap and the ornamental appearance of the shutter can be altered by selecting which of said first and second panels cover the outer surface of said shutter.

2. The shutter assembly as claimed in claim 1 wherein said stiles have a plurality of apertures spaced along ends of said stiles, and said cap having at least one aperture through one of said side walls that can be selectively aligned with one of the plurality of apertures spaced vertically along said ends of said stiles when said cap is slid over one of said ends of said body portion.

3. The shutter assembly as claimed in claim 2 further comprising a second cap having first and second side walls and a first panel which extends from said first side wall to said second side wall, and a second wall and at least one aperture through each of said side walls, said first panel and said second panel each having a different ornamental appearance and being reversible so that said first panel and said second panel can be alternately displayed as the outer surface of said shutter, said cap formed to receive and surround said other of said upper and lower ends of said body portion in a sliding manner such that one of said apertures selectively aligns with one of the plurality of apertures spaced vertically along said other of the ends of said stiles, thereby allowing the length of said shutter to be adjusted by covering selected lengths of said other of the ends with said cap.

4. The shutter assembly claimed in claim 3 further comprising at least one fastener received through said apertures in said caps and through said apertures in said one of the ends of said stiles aligned with said aperture in said cap.

5. The shutter assembly claimed in claim 4, wherein said fasteners are press fit fasteners sized to snugly fit in said apertures.

6. The shutter assembly claimed in claim 4 wherein each of said vertical stiles further have an inner surface including at least four fastener pins protruding therefrom, said fastener pins having a longitudinal axis and a plurality of protrusions arranged along said longitudinal axis, whereby said shutter can be attached to a building structure having apertures aligned and adapted to frictionally engage said fastener pins by inserting said fastener pins therein.

7. A shutter assembly having an outer and an inner surface comprising:

a body portion having upper and lower ends including two vertical stiles having first and second vertical sidewalls having a plurality of apertures spaced vertically along said sidewalls;

a cap having a first panel, a second panel, a first vertical sidewall, and a second vertical sidewall, said first and second panels extended between said side walls, each of said sidewalls having at least one aperture, said first panel and said second panel being reversible and each having a different ornamental appearance so that said first panel and said second panel can be alternately displayed as the outer surface of said shutter to alter the ornamental appearance of said shutter, said cap formed to receive and surround one of said upper and lower ends of said body portion in a sliding manner such that said aperture selectively aligns with one of the plurality of apertures spaced vertically along said sidewalls of said body portion;

at least one fastener received through each of said apertures in said sidewalls of said cap and through each of one of said apertures in said one of the ends of each of said sidewalls of said body portion aligned with said aperture in said sidewall of said cap, thereby allowing the length of said shutter to be adjusted by covering selected lengths of said one of the ends with said cap.

8. The shutter assembly as claimed in claim 7 further comprising a second cap having a first panel, a second panel, a first sidewall, and a second sidewall, said first and second panels extended between said sidewalls, said first and second panels each having a different ornamental appearance, each of said sidewalls having at least one aperture, said first panel and said second panel being reversible so that said first panel and said second panel can be alternately displayed as the outer surface of said shutter, said cap formed to receive and surround the other of said upper and lower ends of said body portion in a sliding manner such that said each of said apertures selectively aligns with one of the plurality of apertures spaced vertically along said other of the ends of said sidewalls of said body portion, thereby allowing the length of said shutter to be adjusted by covering selected lengths of said other of the ends with said cap.

9. The shutter assembly claimed in claim 8 wherein said fasteners are press fit fasteners sized to snugly fit in said apertures.

10. The shutter assembly claimed in claim 9 wherein each of said vertical stiles further have an inner surface including at least four fastener pins protruding therefrom, said fastener pins having a longitudinal axis and a plurality of protrusions arranged along said longitudinal axis, whereby said shutter can be attached to a building structure having apertures aligned and adapted to frictionally engage said fastener pins by inserting said fastener pins therein.

11. A shutter assembly having an outer and an inner surface comprising:

a body portion having upper and lower ends including two vertical stiles and each of said stiles having an inner surface including at least two fastener pins having a longitudinal axis protruding therefrom, said fastener pins having a plurality of protrusions arranged along said longitudinal axis;

a cap having first and second side walls a first panel and a second panel, the panels extending between the side walls, said cap formed to receive and surround one of said upper and lower ends of said body portion in a sliding manner;

whereby said shutter can be attached to a building structure having apertures aligned and adapted to frictionally engage said fastener pins by inserting said fastener pins therein.

\* \* \* \* \*

UNITED STATES PATENT AND TRADEMARK OFFICE
CERTIFICATE OF CORRECTION

PATENT NO. : 5,617,688
DATED : April 8, 1997
INVENTOR(S) : Ginger Gandy, Doug Vagedes, and Michael Vagedes It is certified that error appears in the above-indentified patent and that said Letters Patent is hereby corrected as shown below:

In claim 11, column 8, line 5, after "a cap having first and second side walls" insert --and--.

Signed and Sealed this

Twenty-first Day of October 1997

Attest:

Attesting Officer

BRUCE LEHMAN

Commissioner of Patents and Trademarks